United States Patent
Hailey et al.

(10) Patent No.: US 8,064,838 B2
(45) Date of Patent: Nov. 22, 2011

(54) SYSTEM AND METHOD FOR REDUCING RADIO FREQUENCY INTERFERENCE FROM DIGITAL CIRCUITS

(75) Inventors: Jeffrey C. Hailey, Austin, TX (US); Ernest W. Lentschke, III, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 826 days.

(21) Appl. No.: 12/141,243

(22) Filed: Jun. 18, 2008

(65) Prior Publication Data

US 2009/0316844 A1 Dec. 24, 2009

(51) Int. Cl.
*H04B 1/00* (2006.01)
*H04B 15/00* (2006.01)

(52) U.S. Cl. ............ 455/63.1; 455/114.2; 455/296; 455/300; 455/306; 375/148; 375/254; 361/816; 361/818

(58) Field of Classification Search .......... 455/63.1, 455/114.2, 296, 300, 306; 375/148, 219, 375/254; 361/816, 818
See application file for complete search history.

(56) References Cited

U.S. PATENT DOCUMENTS

| | | | | |
|---|---|---|---|---|
| 5,797,028 A | * | 8/1998 | Gulick et al. | 712/32 |
| 5,832,370 A | * | 11/1998 | Pena-Finol et al. | 455/73 |
| 5,999,416 A | | 12/1999 | McAnally et al. | |
| 6,208,190 B1 | * | 3/2001 | Lukoff | 327/307 |
| 6,615,027 B1 | * | 9/2003 | Sahota et al. | 455/91 |
| 7,388,905 B2 | * | 6/2008 | Vorenkamp | 375/219 |
| 7,545,653 B2 | * | 6/2009 | Itagaki | 361/820 |
| 7,885,630 B2 | * | 2/2011 | Zhu et al. | 455/310 |
| 7,912,438 B2 | * | 3/2011 | Filipovic et al. | 455/310 |
| 2005/0226356 A1 | | 10/2005 | Pirzada et al. | |

* cited by examiner

*Primary Examiner* — Tuan A Tran
(74) *Attorney, Agent, or Firm* — Larson Newman, LLP

(57) ABSTRACT

An information handling system includes a digital circuit having a first terminal connected to a first voltage reference, and a second terminal connected to a second voltage reference. The digital circuit is configured to be coupled to a radio device. The system also includes a band pass filter having a first terminal connected to the first voltage reference, and a second terminal connected to the second voltage reference. The bandpass filter is configured to produce a low impedance response, to reduce a radio frequency noise generated at a specific frequency band of the band pass filter, and to reduce a radio frequency interference produced by the digital circuit and received at the radio device.

20 Claims, 6 Drawing Sheets

SYSTEM AND METHOD FOR REDUCING RADIO FREQUENCY INTERFERENCE FROM DIGITAL CIRCUITS

FIELD OF THE DISCLOSURE

This disclosure generally relates to information handling systems, and more particularly relates to a system and method for reducing radio frequency interference from digital circuits.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can have a radio device to provide wireless communication between the information handling system and a remote device. However, different digital circuits in the information handling system may generate radio frequency (RF) noise that can interfere with the ability of the radio device to communicate with the remote device. Such RF noise is typically due to the switching of transistors within the digital circuits of the information handling system. As the transistors switch states, a small voltage is drawn because of the non-zero impedance of a power system of the information handling system. This voltage is carried through the digital circuit and can be re-radiated from an interconnect mechanism of the digital circuit, such as a printed wire board, a cable, and the like. The RF noise from the interconnect mechanism may be picked up by an antenna of the radio device, degrading its performance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
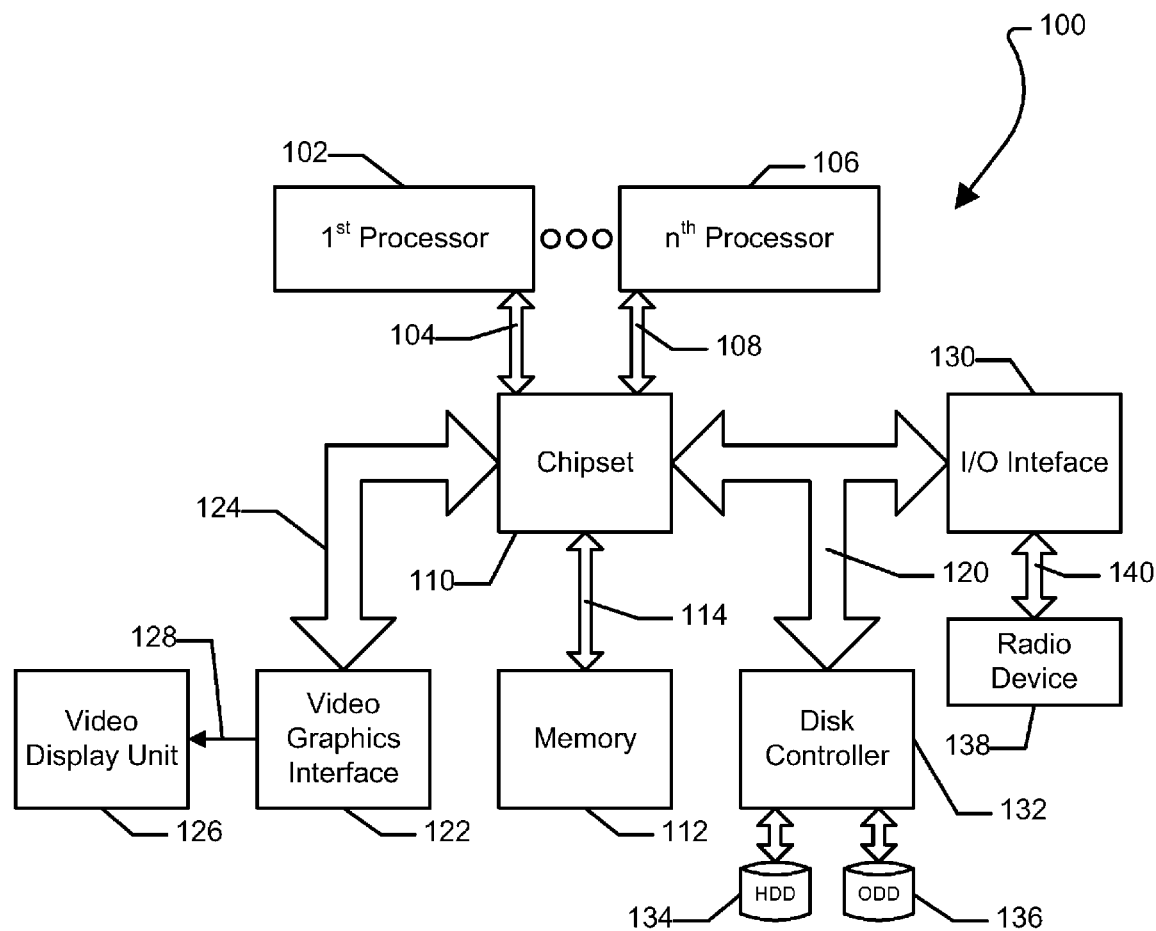
FIG. 1 is a block diagram of an information handling system according to one aspect of the disclosure.

FIG. 1 shows a block diagram of an exemplary embodiment of an information handling system, generally designated at 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As shown in FIG. 1, the information handling system 100 can include a first physical processor 102 coupled to a first host bus 104, and can further include additional processors generally designated as $n^{th}$ physical processor 106 coupled to $n^{th}$ host bus 108. The first physical processor 102 can be coupled to a chipset 110 via the first host bus 104. Further, the $n^{th}$ physical processor 106 can be coupled to the chipset 110 via the $n^{th}$ host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example the chipset 110, including an AHA enabled-chipset, can include a memory controller hub and an input/output (I/O) controller hub. As a memory controller hub, the chipset 110 can function to provide access to first physical processor 102 using first bus 104, and to $n^{th}$ physical processor 106 using the $n^{th}$ host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers among the buses 104, 108, and 114.

According to another aspect, the chipset 110 can generally be considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E chipset, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 may also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 may also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 2.6 GB/s (gigabits per second). PCI buses and PCI-Express buses can be provided to comply with industry standards for connecting and communicating between various PCI-enabled hardware devices. Other buses can also be provided in association with, or independent of, the I/O bus 120 including industry standard buses or proprietary buses such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first host bus 104 and the nth host bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Additionally, the information handling system 100 can include a radio device 138 coupled to the I/O interface 130 via a radio device bus 140. The radio device can provide the information handling system 100 with wireless communication to a number of remote devices (not shown). The radio device can be a Wireless Fidelity (WiFi) device, a Worldwide Interoperability for Microwave Access (Wi-MAX) device, a Bluetooth device, a Global Positioning System device, a Global System for Mobile communications device, a cellular device, a radio frequency device, and the like. The radio device 138 can communicate with the remote devices using radio frequency signals.

Figure 2:
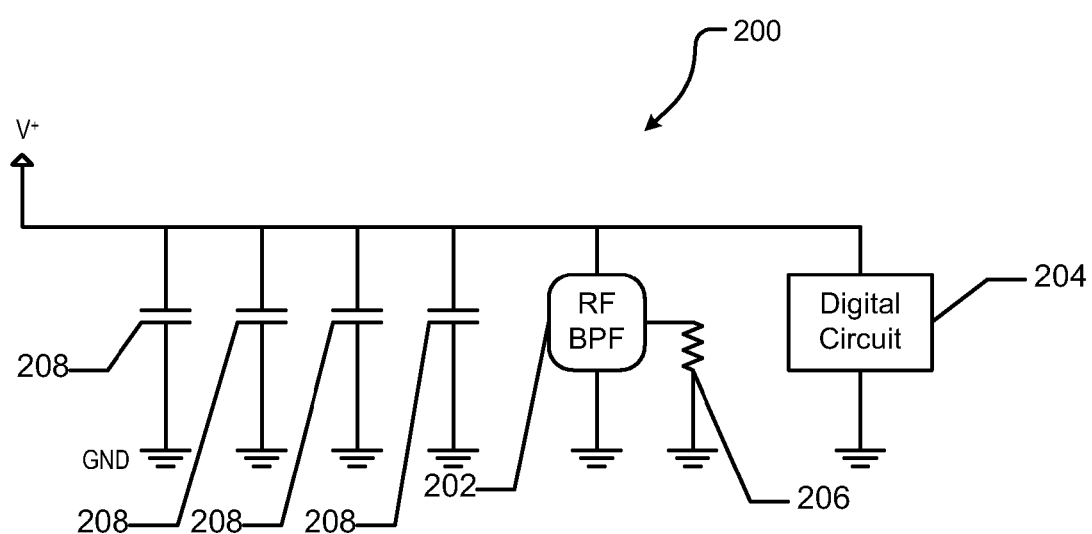
FIGS. 2-6 are partial schematic and block diagrams of various embodiments of a low impedance circuit of the information handling system of FIG. 1.

FIG. 2 shows a partial schematic and block diagram of an embodiment of a low impedance circuit 200 including a band pass filter 202, a digital circuit 204, a resistor 206, and a plurality of capacitors 208. The digital circuit 204 can be the first physical processor 102, the memory 112, the video display 126, and the like of FIG. 1. The band pass filter 202 has a first terminal connected to a first voltage reference labeled V+, a second terminal connected to a second voltage reference labeled GND, and a third terminal. The digital circuit 204 has a first terminal connected to the first voltage reference and to the first terminal of the band pass filter 202, and a second terminal connected to the second voltage reference. The resistor 206 has a first terminal connected to the third terminal of the band pass filter 202, and a second terminal connected to the second voltage reference. The capacitors 208 have first terminals connected to the first voltage reference, and second terminals connected to the second voltage reference.

The band pass filter 202 can be designed such that an impedance level of the low impedance circuit 200 is the lowest within a specific frequency band of the band pass filter. For example, the band pass filter 202 can have an inductor and a capacitor placed in a series connection so that at a resonance frequency of the band pass filter the impedance is substantially equal to zero. The digital circuit 204 can include transistors (not shown) that are switched on and off while the digital circuit is operating. As the transistors of the digital circuit 204 change states (turn on or off), a current is drawn from a power supply system (not shown), and the current creates a small voltage because the impedance of the power supply system is not zero. The resulting voltage creates electromagnetic interference (EMI) that can interfere with the ability of the radio device 138 to properly receive a desired radio frequency signal. Additionally, the capacitors 208 are connected in parallel to further lower the impedance level.

During operation, the frequency band of the band pass filter 202 preferably includes the frequency range of the radio frequency signal received by the radio device 138. Therefore, as the band pass filter 202 provides a low impedance over the specific frequency band, the digital circuit 204 does not produce as much voltage while drawing current during state changes of the transistors. The lower voltage produced causes the EMI of the digital circuit 204 to decease within the frequency range of the band pass filter 202, including the frequency range of the radio signals received by the radio device 138 of FIG. 1. Thus, the radio device 138 can receive the radio frequency signals with less interference from the digital circuit 204 and can improve the communication between the information handling system 100 and the remote device.

Figure 3:
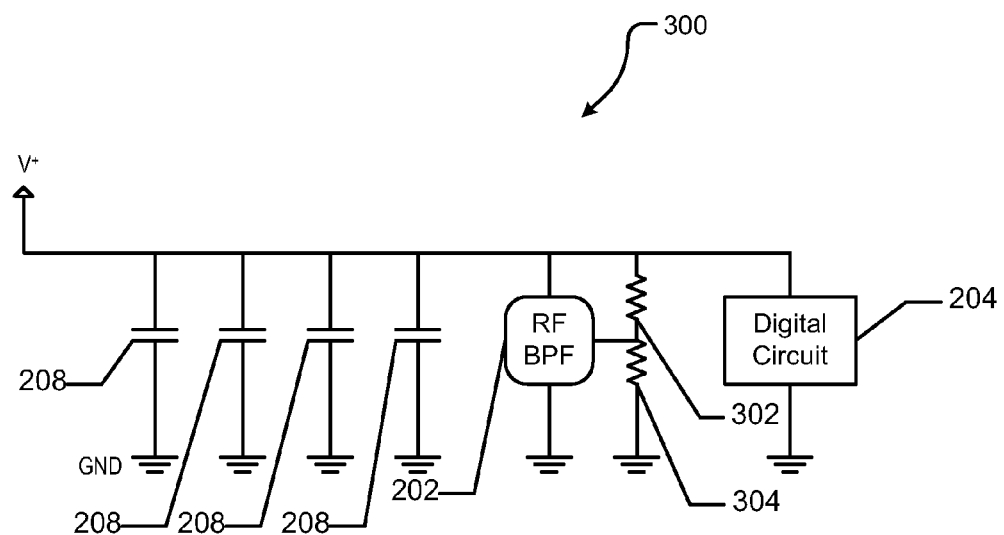

FIG. 3 shows an alternative embodiment of a low impedance circuit 300 including resistors 302 and 304. In this embodiment, the band pass filter 202 has a first terminal connected to the first voltage reference, a second terminal connected to a second voltage reference, and a third terminal. The digital circuit 204 has a first terminal connected to the first voltage reference and to the first terminal of the band pass filter 202, and a second terminal connected to the second voltage reference. The resistor 302 has a first terminal connected to the third terminal of the band pass filter 202, and a second terminal connected to the first voltage reference. The resistor 304 has a first terminal connected to the third terminal of the band pass filter 202 and to the first terminal of the resistor 302, and a second terminal connected to the second voltage reference. The capacitors 208 have first terminals connected to the first voltage reference, and second terminals connected to the second voltage reference. The band pass filter 202 and the low impedance circuit 300 can provide substantially the same low impedance level and can reduce the RF interference caused by the digital circuit 204 as described with respect to the low impedance circuit 200.

Figure 4:
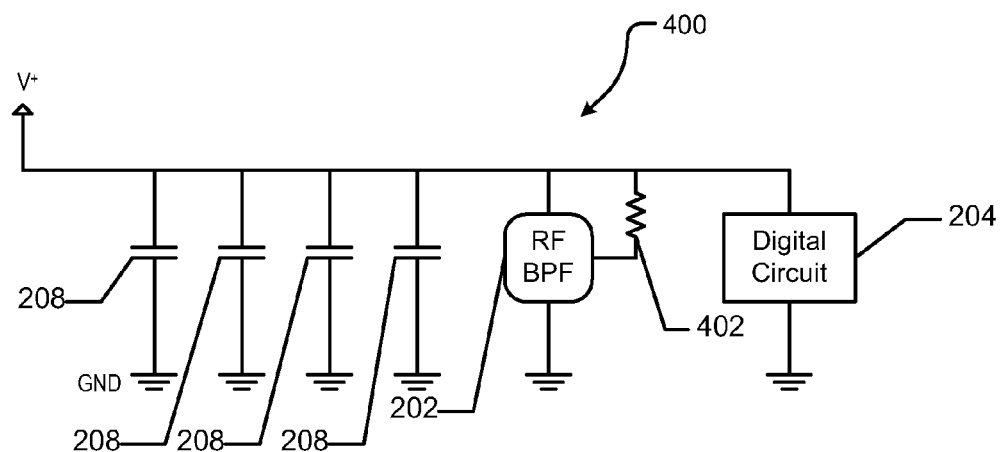

FIG. 4 shows an alternative embodiment of a low impedance circuit 300 including a resistor 402. In this embodiment, the band pass filter 202 has a first terminal connected to the first voltage reference, a second terminal connected to a second voltage reference, and a third terminal. The digital circuit 204 has a first terminal connected to the first voltage reference and to the first terminal of the band pass filter 202, and a second terminal connected to the second voltage reference. The resistor 402 has a first terminal connected to the third terminal of the band pass filter 202, and a second terminal connected to the first voltage reference. The capacitors 208 have first terminals connected to the first voltage reference, and second terminals connected to the second voltage reference. The band pass filter 202 and the low impedance circuit 400 can provide substantially the same low impedance level and can reduce the RF interference caused by the digital circuit 204 as described with respect to the low impedance circuit 200.

Figure 5:
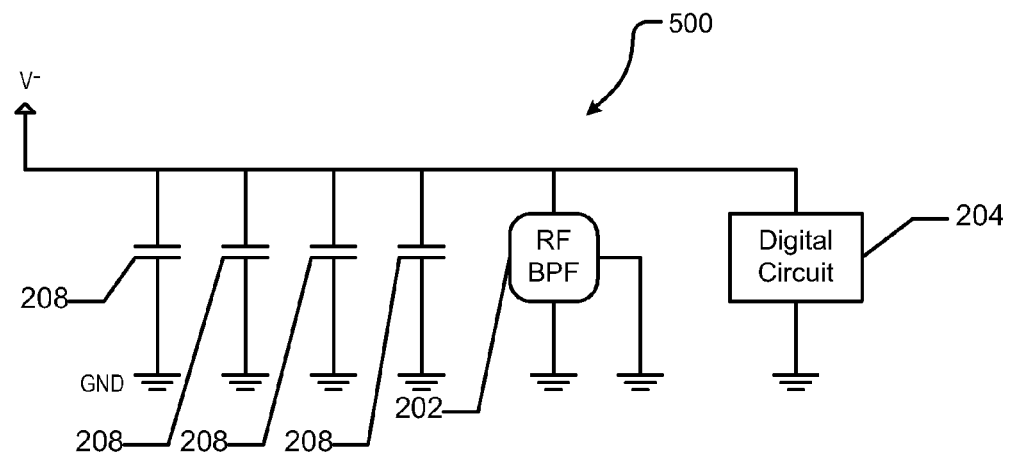

FIG. 5 shows an alternative embodiment of a low impedance circuit 500. In this embodiment, the band pass filter 202 has a first terminal connected to the first voltage reference, a second terminal connected to a second voltage reference, and a third terminal connected to the second voltage reference. The digital circuit 204 has a first terminal connected to the first voltage reference and to the first terminal of the band pass filter 202, and a second terminal connected to the second voltage reference. The capacitors 208 have first terminals connected to the first voltage reference, and second terminals connected to the second voltage reference. The band pass filter 202 and the low impedance circuit 500 can provide substantially the same low impedance level and can reduce the RF interference caused by the digital circuit 204 as described with respect to the low impedance circuit 200.

Figure 6:
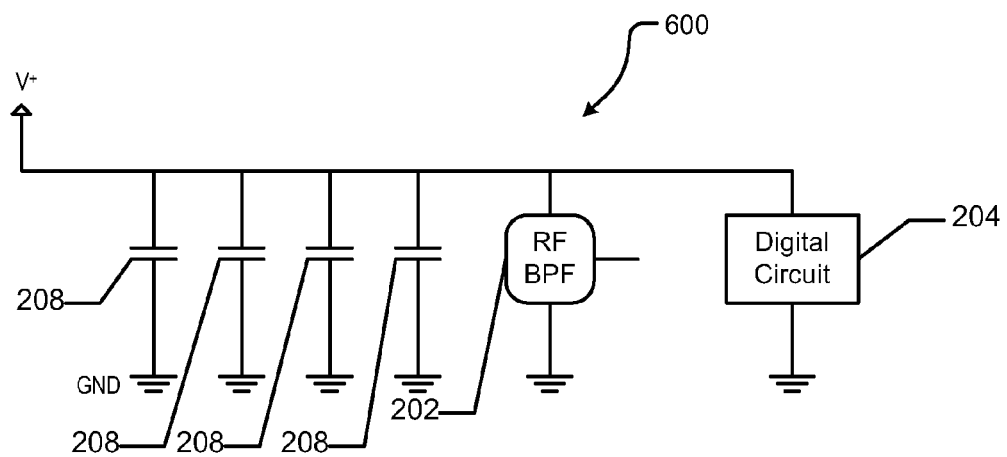

FIG. 6 shows an alternative embodiment of a low impedance circuit 600. In this embodiment, the band pass filter 202 has a first terminal connected to the first voltage reference, a second terminal connected to a second voltage reference, and a third terminal. The digital circuit 204 has a first terminal connected to the first voltage reference and to the first terminal of the band pass filter 202, and a second terminal connected to the second voltage reference. The capacitors 208 have first terminals connected to the first voltage reference, and second terminals connected to the second voltage reference. The band pass filter 202 and the low impedance circuit 600 can provide substantially the same low impedance level and can reduce the RF interference caused by the digital circuit 204 as described with respect to the low impedance circuit 200.

Figure 7:
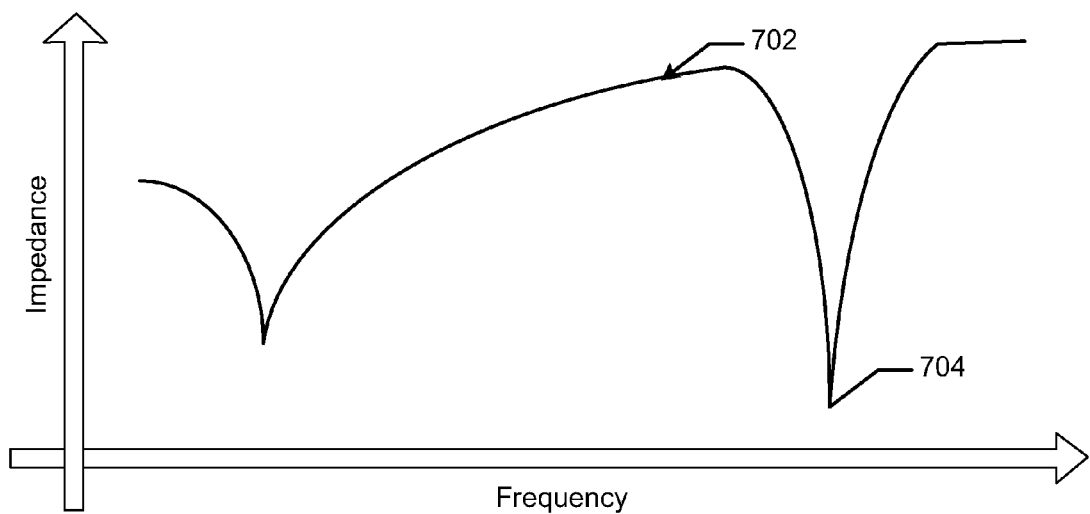
FIG. 7 is a response curve representing an impedance profile of a band pass filter of FIG. 2.

FIG. 7 shows a response curve 702 representing an exemplary impedance profile of the low impedance circuit 200. As shown by the response curve 702, the impedance level of low impedance circuit 200 is lower within the frequency band of the band pass filter 202 than over the frequency ranges outside the frequency band of the band pass filter. Additionally, the response curve 702 has a dip 704 at a resonance frequency of the band pass filter 202 and the impedance at the dip 704 is substantially equal to zero.

Figure 8:
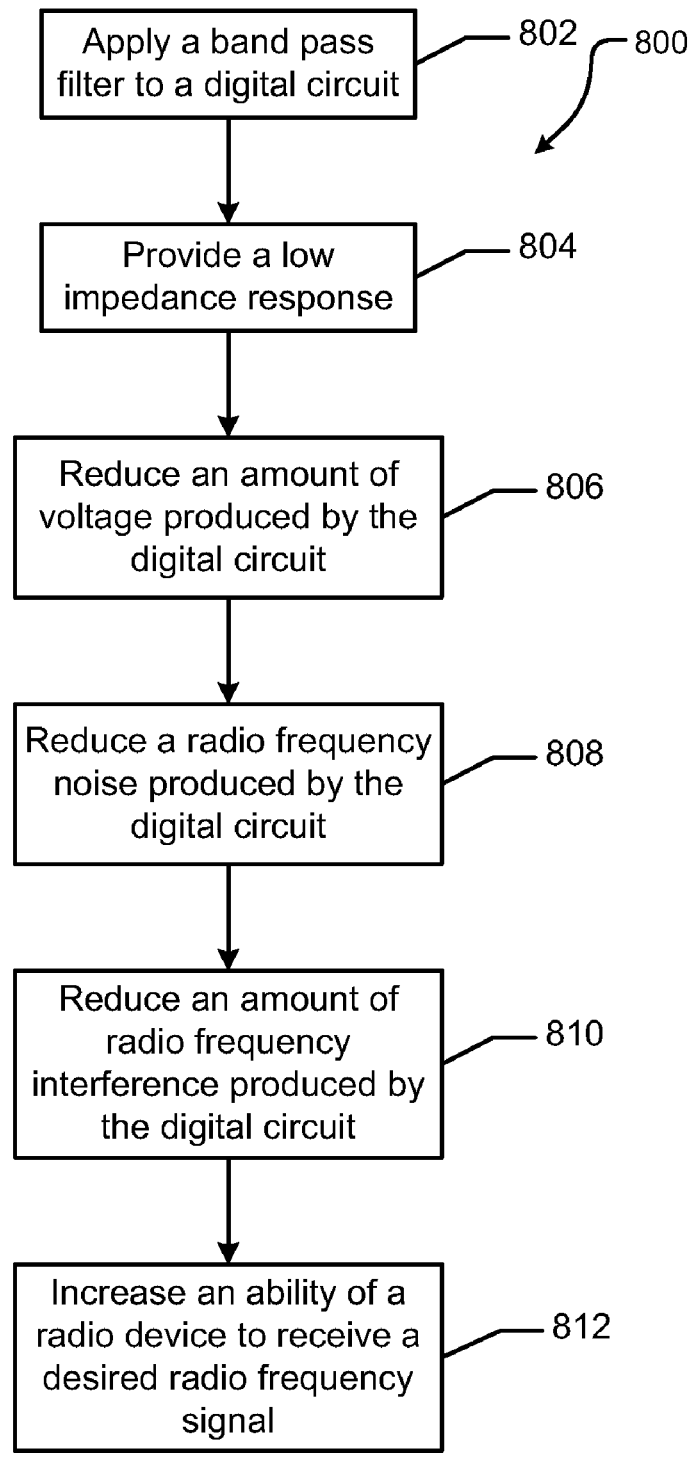
FIG. 8 is a flow diagram of a method for reducing an amount of radio frequency interference produced by a digital circuit.

The band pass filter 202 can provide a low impedance response for the low impedance circuit 200 at the frequency band of the band pass filter, and reduce the RF interference produced by the digital circuit 204. FIG. 8 shows a flow diagram of a method 800 for reducing an amount of RF interference produced by a digital circuit. At block 802, a band pass filter is applied to a digital circuit. The band pass filter is preferably placed in parallel with the digital circuit between a first voltage reference and a second voltage reference. The digital circuit can be a central processing unit, a memory device, a liquid crystal display, and the like.

At block 804, a low impedance response is provided to the digital circuit. The low impedance response is over the frequency band of the band pass filter. At block 806, an amount of voltage produced over a power supply system by the digital circuit is reduced. The voltage is produced as a result of a current being drawn by the digital current from the power supply system along with the impedance of the power supply system not being equal to zero. An amount of radio frequency noise produced by the digital circuit is reduced at block 808. At block 810, an amount of RF interference produced by the digital circuit is reduced. An ability to receive a desired radio frequency signal at a radio receiver coupled to the digital circuit is increased at block 812.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a digital circuit having a first terminal connected to a first voltage reference, and a second terminal connected to a second voltage reference, the digital circuit configured to be coupled to a radio device; and
a band pass filter having a first terminal connected to the first voltage reference, and a second terminal connected to the second voltage reference, the band pass filter configured to produce a low impedance response and to reduce a radio frequency noise generated at a specific frequency band of the band pass filter, and further configured to reduce a radio frequency interference produced by the digital circuit and received at the radio device.

2. The information handling system of claim 1 wherein the radio device is selected from the group consisting of a Bluetooth device, a radio frequency device, a wireless fidelity device, a worldwide interoperability for microwave access device, and a cellular device.

3. The information handling system of claim 1 wherein the digital circuit is selected from the group consisting of a display device, a memory, and a processor.

4. The information handling system of claim 1 wherein the band pass filter further comprises a third terminal connected to the second voltage reference.

5. The information handling system of claim 1 further comprising:

a resistor having a first terminal connected to a third terminal of the band pass filter, and a second terminal connected to the second voltage reference.

6. The information handling system of claim 1 further comprising:
a resistor having a first terminal connected to a third terminal of the band pass filter, and a second terminal connected to the first voltage reference.

7. The information handling system of claim 1 further comprising:
a first resistor having a first terminal connected the third terminal of the band pass filter, and a second terminal connected to the first voltage reference; and
a second resistor having a first terminal connected to the third terminal of the band pass filter, and a second terminal connected to the to the second voltage reference.

8. A method comprising:
applying a band pass filter to a digital circuit;
providing a low impedance response at a frequency band of the band pass filter;
reducing a radio frequency noise produced by the digital circuit at the frequency band of the band pass filter; and
reducing an amount of radio frequency interference produced by the digital circuit.

9. The method of claim 8 further comprising:
increasing an ability of a radio device, coupled to the digital circuit, to receive a desired radio frequency signal.

10. The method of claim 9 wherein the radio device is selected from the group consisting of a Bluetooth device, a radio frequency device, a wireless fidelity device, a worldwide interoperability for microwave access device, and a cellular device.

11. The method of claim 9 wherein the desired radio frequency signal is within the frequency band of the band pass filter.

12. The method of claim 8 wherein the digital circuit is selected from the group consisting of a display device, a memory, and a processor.

13. The method of claim 8 further comprising:
reducing an amount of voltage produced by the digital circuit, wherein the voltage produces the radio frequency interference.

14. An information handling system comprising:
a radio device configured to receive a radio frequency signal;
a digital circuit coupled to the radio device, the digital circuit having a first terminal connected to a first voltage reference, and a second terminal connected to a second voltage reference, the digital circuit configured to be coupled to the radio device; and
a band pass filter having a first terminal connected to the first voltage reference, and a second terminal connected to the second voltage reference, the band pass filter configured to produce a low impedance response and to reduce a radio frequency noise generated at a specific frequency band of the band pass filter, and further configured to reduce a radio frequency interference produced by the digital circuit and received at the radio device.

15. The information handling system of claim 14 wherein the radio device is selected from the group consisting of a Bluetooth device, a radio frequency device, a wireless fidelity device, a worldwide interoperability for microwave access device, and a cellular device.

16. The information handling system of claim 14 wherein the digital circuit is selected from the group consisting of a display device, a memory, and a processor.

17. The information handling system of claim 14 wherein the band pass filter further comprises a third terminal connected to the second voltage reference.

18. The information handling system of claim 14 further comprising:
a resistor having a first terminal connected to a third terminal of the band pass filter, and a second terminal connected to the second voltage reference.

19. The information handling system of claim 14 further comprising:
a resistor having a first terminal connected to a third terminal of the band pass filter, and a second terminal connected to the first voltage reference.

20. The information handling system of claim 14 further comprising:
a first resistor having a first terminal connected the third terminal of the band pass filter, and a second terminal connected to the first voltage reference; and
a second resistor having a first terminal connected to the third terminal of the band pass filter, and a second terminal connected to the to the second voltage reference.

* * * * *